C. W. HODGES.
CHAIN.
APPLICATION FILED APR. 24, 1919.
1,314,747. Patented Sept. 2, 1919.
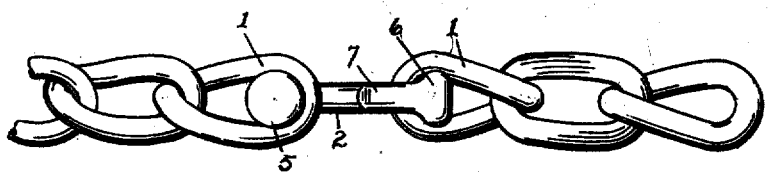
Fig. I.
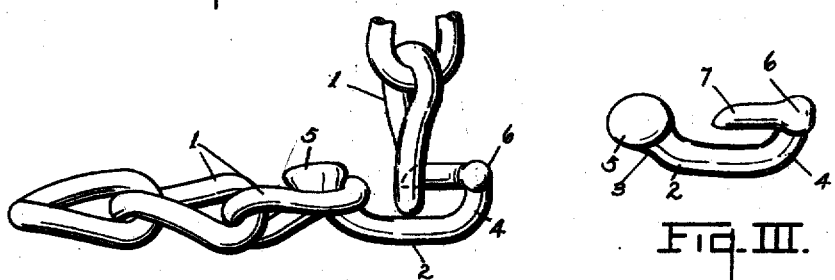
Fig. II.
Fig. III.
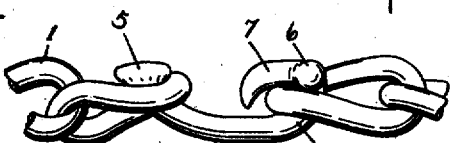
Fig. IV.
Inventor
CHAUNCEY W. HODGES ard the body to prevent the disengagement
UNITED STATES PATENT OFFICE.

CHAUNCEY W. HODGES, OF GALESBURG, MICHIGAN.

CHAIN.

1,314,747. Specification of Letters Patent. Patented Sept. 2, 1919.

Application filed April 24, 1919. Serial No. 292,314.

*To all whom it may concern:*

Be it known that I, CHAUNCEY W. HODGES, a citizen of the United States, residing at Galesburg, county of Kalamazoo, State of Michigan, have invented certain new and useful Improvements in Chains, of which the following is a specification.

This invention relates to improvements in chains.

The main object of this invention is to provide an improved coupling or repair link for chains well adapted for the coupling or repair of such chains as the tread or cross chains of tire chains.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention.

Fig. II is a detail side view showing one of my improved coupling or repair links with one of its coacting links engaged and the other in its initial position for engaging.

Fig. III is a perspective view of my improved connecting or repair link.

Fig. IV is a detail side view of parts shown in Fig. I.

In the drawing similar reference characters refer to similar parts throughout the several views.

Referring to the drawing, 1, 1, represent the links of a chain of well-known twisted link type which, for convenience in description, I designate herein as loop links. My improved repair or connecting link comprises a bar-like body portion 2 having laterally projecting neck portions 3 and 4 at its ends.

The neck portion 3 terminates in a rounded head 5 of such size as to prevent its passing through the loop links. The neck portion 4 terminates in a T-shaped head comprising a cross portion 6 and a stem portion 7. The cross portion is disposed transversely of the body portion 2 and the stem portion longitudinally above the body portion. The loop links may be passed over this T-shaped head by manipulating them, first passing the link over the stem 7 as shown in Fig. II, then swinging the link to a position longitudinally of the cross portion 6 and then swinging into alinement as shown in Fig. I, the first link engaged being slipped along the neck 3 into engagement with the rounded head 5, the second one engaged being engaged with the neck 4.

The end of the stem 7 is then bent down toward the body as shown in Fig. IV, preventing the links becoming disengaged.

The cross portion 6 is of such length as to overlap the side members of the link 1 engaged therewith as shown in Fig. I.

My improvements are especially desirable for repairing the cross members of tire chains although of general utility. The links may be quickly engaged and as a temporary repair it is not necessary to bend down the part 7. However, this may be quickly done with the aid of a hammer or stone or the like, so that repairs may be quickly made even without the aid of any tools.

Having thus described my invention, what I claim as new and desire to secure by Letters Patent, is:

1. In a chain, the combination of a pair of loop links to be joined and a connecting link therefor having laterally projecting neck portions at its ends, one of which terminates in a rounded head of such size as to prevent its passing through the loop links, and the other in a T-shaped head over which the loop links may be manipulated, the cross portion of said head being disposed transversely of the body and the stem longitudinally above and adapted to be bent toward the body to prevent the disengagement of the link, the cross portion being of such length as to overlap the side portions of the loop link engaged therewith.

2. In a chain, the combination of a pair of loop links to be joined and a connecting link therefor having laterally projecting neck portions at its ends, one of which terminates in a head of such size as to prevent its passing through the loop links, and the other in a head over which the loop links may be manipulated, the second head having a portion bendable to prevent the disengagement of the link.

3. A connecting link for a chain having loop links comprising a bar-like body portion having laterally projecting neck portions at its ends, one of which terminates in a head of such size as to prevent its passing through the coacting loop links, and the other in a T-shaped head over which the coacting loop links may be manipulated, the cross portion of said head being disposed transversely of the body and the stem longitudinally of the body.

In witness whereof, I have hereunto set my hand and seal in the presence of two witnesses.

CHAUNCEY W. HODGES. [L. S.]

Witnesses:
 LUELLA G. GREENFIELD,
 M. L. GLASGOW.

Copies of this patent may be obtained for five cents each, by addressing the "Commissioner of Patents Washington, D. C."